(12) United States Patent
Henry et al.

(10) Patent No.: US 9,367,497 B2
(45) Date of Patent: Jun. 14, 2016

(54) RECONFIGURABLY DESIGNATING MASTER CORE FOR CONDITIONAL OUTPUT ON SIDEBAND COMMUNICATION WIRES DISTINCT FROM SYSTEM BUS

(71) Applicant: VIA TECHNOLOGIES, INC., New Taipei (TW)

(72) Inventors: G. Glenn Henry, Austin, TX (US); Stephan Gaskins, Austin, TX (US)

(73) Assignee: VIA TECHNOLOGIES, INC., New Taipei (TW)

( * ) Notice: Subject to any disclaimer, the term of this patent is extended or adjusted under 35 U.S.C. 154(b) by 19 days.

(21) Appl. No.: 14/522,931

(22) Filed: Oct. 24, 2014

(65) Prior Publication Data

US 2015/0046680 A1    Feb. 12, 2015

Related U.S. Application Data

(62) Division of application No. 13/299,239, filed on Nov. 17, 2011, now Pat. No. 8,972,707.

(60) Provisional application No. 61/426,470, filed on Dec. 22, 2010.

(51) Int. Cl.
*G06F 13/36* (2006.01)
*G06F 15/163* (2006.01)
(Continued)

(52) U.S. Cl.
CPC ........ *G06F 13/36* (2013.01); *G06F 1/24* (2013.01); *G06F 1/3287* (2013.01);
(Continued)

(58) Field of Classification Search
None
See application file for complete search history.

(56) References Cited

U.S. PATENT DOCUMENTS

| 4,748,559 A | 5/1988 | Smith et al. |
| 5,467,455 A | 11/1995 | Gay et al. |

(Continued)

FOREIGN PATENT DOCUMENTS

| CN | 101111814 | 1/2008 |
| CN | 101901177 | 12/2010 |

OTHER PUBLICATIONS

"Intel® Core™ 2 Extreme Quad-Core Mobile Processor and Intel® Core™ 2 Quad Mobile Processor on 45-nm Process." Datasheet. For platforms based on Mobile Intel® 4 Series Express Chipset Family. Jan. 2009 Document No. 320390-002 pp. 1-72.

(Continued)

*Primary Examiner* — Kenneth Kim
(74) *Attorney, Agent, or Firm* — E. Alan Davis; James W. Huffman; Eric W. Cernyar

(57) ABSTRACT

A method for dynamically reconfiguring one or more cores of a multi-core microprocessor comprising a plurality of cores and sideband communication wires, extrinsic to a system bus connected to a chipset, which facilitate non-system-bus inter-core communications. At least some of the cores are operable to be reconfigurably designated with or without master credentials for purposes of structuring sideband-based inter-core communications. The method includes determining an initial configuration of cores of the microprocessor, which configuration designates at least one core, but not all of the cores, as a master core, and reconfiguring the cores according to a modified configuration, which modified configuration removes a master designation from a core initially so designated, and assigns a master designation to a core not initially so designated. Each core is configured to conditionally drive a sideband communication wire to which it is connected based upon its designation, or lack thereof, as a master core.

21 Claims, 3 Drawing Sheets

(51) Int. Cl.

| | | |
|---|---|---|
| *G06F 1/32* | (2006.01) | |
| *G06F 1/24* | (2006.01) | |
| *G06F 9/30* | (2006.01) | |
| *G06F 9/50* | (2006.01) | |
| *G06F 9/445* | (2006.01) | |
| *G06F 15/82* | (2006.01) | |
| G06F 11/36 | (2006.01) | |
| G06F 11/14 | (2006.01) | |

(52) U.S. Cl.
CPC ....... *G06F 9/30076* (2013.01); *G06F 9/30083* (2013.01); *G06F 9/44505* (2013.01); *G06F 9/5094* (2013.01); *G06F 15/163* (2013.01); *G06F 15/82* (2013.01); *G06F 11/1423* (2013.01); *G06F 11/3664* (2013.01); *Y02B 60/142* (2013.01)

(56) References Cited

U.S. PATENT DOCUMENTS

| | | | |
|---|---|---|---|
| 5,485,625 | A | 1/1996 | Gumkowski |
| 5,546,588 | A | 8/1996 | Deems et al. |
| 5,918,061 | A | 6/1999 | Nikjou |
| 6,496,880 | B1 * | 12/2002 | Ma et al. ............ 710/38 |
| 6,665,802 | B1 | 12/2003 | Ober |
| 6,968,467 | B2 | 11/2005 | Inoue et al. |
| 7,257,679 | B2 | 8/2007 | Clark |
| 7,308,558 | B2 | 12/2007 | Arimilli et al. |
| 7,358,758 | B2 | 4/2008 | Gaskins et al. |
| 7,451,333 | B2 | 11/2008 | Naveh et al. |
| 7,467,294 | B2 | 12/2008 | Matsuoka et al. |
| 8,024,591 | B2 | 9/2011 | Bertelsen et al. |
| 8,046,615 | B2 | 10/2011 | Taguchi et al. |
| 8,103,816 | B2 | 1/2012 | Tiruvallur et al. |
| 8,214,632 | B2 | 7/2012 | Choi et al. |
| 8,358,651 | B1 | 1/2013 | Kadosh et al. |
| 8,359,436 | B2 | 1/2013 | Vash et al. |
| 2003/0202530 | A1 * | 10/2003 | Jenkins et al. ............ 370/447 |
| 2004/0019827 | A1 | 1/2004 | Rohfleisch et al. |
| 2004/0117510 | A1 | 6/2004 | Arimilli et al. |
| 2005/0138249 | A1 | 6/2005 | Galbraith et al. |
| 2006/0171244 | A1 | 8/2006 | Ando |
| 2006/0224809 | A1 | 10/2006 | Gelke et al. |
| 2006/0282692 | A1 | 12/2006 | Oh |
| 2007/0070673 | A1 | 3/2007 | Borkar et al. |
| 2007/0143514 | A1 | 6/2007 | Kaushik et al. |
| 2007/0266262 | A1 | 11/2007 | Burton et al. |
| 2008/0129274 | A1 | 6/2008 | Komaki |
| 2009/0013217 | A1 | 1/2009 | Shibata et al. |
| 2009/0083516 | A1 | 3/2009 | Saleem et al. |
| 2009/0094481 | A1 | 4/2009 | Vera et al. |
| 2009/0172423 | A1 | 7/2009 | Song et al. |
| 2009/0222654 | A1 | 9/2009 | Hum et al. |
| 2009/0240973 | A1 | 9/2009 | Muraki |
| 2009/0307408 | A1 | 12/2009 | Naylor |
| 2009/0319705 | A1 | 12/2009 | Foong et al. |
| 2010/0026352 | A1 | 2/2010 | Jacobowitz et al. |
| 2010/0058078 | A1 | 3/2010 | Branover et al. |
| 2010/0138683 | A1 | 6/2010 | Burton et al. |
| 2010/0235672 | A1 | 9/2010 | Zhang et al. |
| 2010/0250821 | A1 | 9/2010 | Mueller |
| 2010/0325481 | A1 | 12/2010 | Dahan et al. |
| 2010/0332869 | A1 | 12/2010 | Hsin et al. |
| 2011/0119672 | A1 | 5/2011 | Ramaraju et al. |
| 2011/0153984 | A1 | 6/2011 | Wolfe et al. |
| 2011/0185125 | A1 | 7/2011 | Jain et al. |
| 2011/0265090 | A1 | 10/2011 | Moyer et al. |
| 2011/0271126 | A1 | 11/2011 | Hill |
| 2011/0295543 | A1 | 12/2011 | Fox et al. |
| 2012/0005514 | A1 | 1/2012 | Henry et al. |
| 2012/0023355 | A1 | 1/2012 | Song et al. |
| 2012/0079290 | A1 | 3/2012 | Kumar et al. |
| 2012/0124264 | A1 | 5/2012 | Tiruvallur et al. |
| 2012/0161328 | A1 | 6/2012 | Henry et al. |
| 2012/0166763 | A1 | 6/2012 | Henry et al. |
| 2012/0166764 | A1 | 6/2012 | Henry et al. |
| 2012/0166832 | A1 | 6/2012 | Henry et al. |
| 2012/0166837 | A1 | 6/2012 | Henry et al. |
| 2012/0166845 | A1 | 6/2012 | Henry et al. |
| 2012/0239847 | A1 | 9/2012 | Gaskins |
| 2014/0084427 | A1 | 3/2014 | Gaskins |
| 2014/0164816 | A1 | 6/2014 | Gaskins et al. |
| 2014/0173301 | A1 | 6/2014 | Henry et al. |

OTHER PUBLICATIONS

"Intel® Atom™ Processor 330ªSeries." Datasheet. For systems based on Nettop Platform for '08. Revision 002. Feb. 2009. Document No. 320528-002. pp. 1-50.

"Intel® Core™ 2 Duo Processors and Intel® Core™ 2 Extreme Processors for Platforms Based on Mobile Intel® 965 Express Chipset Family." Datasheet. Jan. 2008. Document No. 316745-005. pp. 1-87.

"Intel® Core™ Duo Processor and Intel® Core™ Solo Processor on 65 nm Processs." Datasheet. Jan. 2007. Document No. 309221-006. pp. 1-91.

Richard, Michael Graham. "Intel's Next CPU to Include Dedicated 'Power Control Unit' to Save Power." Aug. 22, 2008. Downloaded from http://www.treehugger.com/files/2008/08/intel-cpu-processor-nehalem-i7-power-pcu.php on Jul. 14, 2010. pp. 1-4.

Naveh, Alon et al. "Power and Thermal Management in Intel® Core™ Duo Processor." Intel® Technology Journal. vol. 10, Issue 02, Published May 15, 2006. ISSN 1535-864X pp. 109-123.

Glaskowsky, Peter. "Investigating Intel's Lynnfield Mysteries." Mcall.com, CNET News, Speeds and Feeds. Sep. 21, 2009. Downloaded from http://mcall.com.com/8301-13512_3-10357328-23.html?tag=mncol;txt downloaded on Jul. 14, 2010. pp. 1-4.

Wasson, Scott. "Intel's Core i7 Processors; Nehalem Arrives with a Splash." The Tech Report. Nov. 3, 2008. Downloaded from http://techreport.com/articles.x/15818/1 on Jul. 14, 2010. pp. 1-11.

"Intel® QuickPath Architecture; A New System Architecture." White Paper Document No. 319725-001US. Mar. 2008 pp. 1-6.

Sartori, John et al. "Distributed Peak Power Management for Many-core Architectures." Published in Design, Automation & Test in Europe Conference & Exhibition, Apr. 2009, pp. 1556-1559.

* cited by examiner

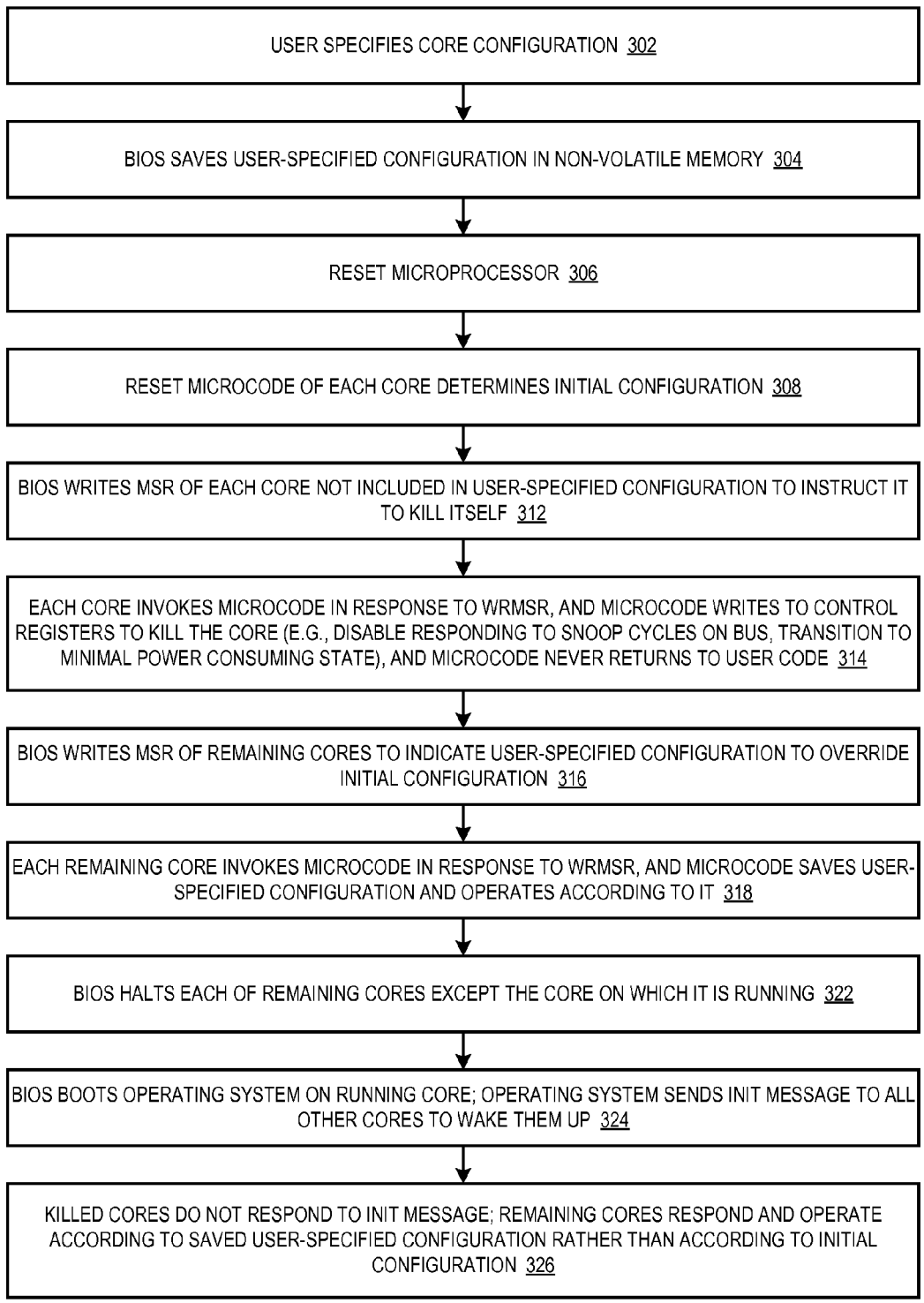

RECONFIGURABLY DESIGNATING MASTER CORE FOR CONDITIONAL OUTPUT ON SIDEBAND COMMUNICATION WIRES DISTINCT FROM SYSTEM BUS

CROSS REFERENCE TO RELATED APPLICATION(S)

This application is a divisional of U.S. Non-Provisional application Ser. No. 13/299,239, which claims priority based on U.S. Provisional Application Ser. No. 61/426,470, filed Dec. 22, 2010, entitled MULTI-CORE INTERNAL BYPASS BUS, each of which is hereby incorporated by reference in its entirety.

This application is related to the following U.S. patent applications, each of which is hereby incorporated by reference in its entirety.

| Ser. No. | Filing Date | Pat. No. |
|---|---|---|
| 13/299,014 | Nov. 17, 2011 | N/A |
| 13/299,059 | Nov. 17, 2011 | 8,782,451 |
| 13/299,122 | Nov. 17, 2011 | 8,635,476 |
| 13/299,171 | Nov. 17, 2011 | 8,637,212 |
| 13/299,207 | Nov. 17, 2011 | N/A |
| 13/299,225 | Nov. 17, 2011 | 8,631,256 |

FIELD OF THE INVENTION

The present invention relates in general to the field of multi-core microprocessors, and particularly to the ability to dynamically disable or reconfigure the cores thereof.

BACKGROUND OF THE INVENTION

In some conventional multi-core microprocessors, the manufacturer may blow fuses on each core of the microprocessor to specify to each core the configuration of the cores on the multi-core microprocessor so that each core can statically determine from the fuse values which cores of the multi-core microprocessor are enabled to perform data processing in the system. Although this solution may have advantages, a disadvantage is that once the fuses are blown on the core for use in a first multi-core microprocessor configuration, the core with already-blown fuses may not be reconfigured in the event that demand for the second configuration arises. In some applications, such as performance testing or application of software that does not support multiple cores, it may be desirable to disable cores. Also, in many applications, not all of the cores of a microprocessor are needed, and even though cores may, under such circumstances, be put into a sleep state to conserve power, they still cause drag on the processor or system bus shared with the other cores. Drag can be caused, for example, by the core responding to snoop cycles. Also, individual cores of a multi-core microprocessor may be defective as manufactured or may fail during testing or operation. This may interfere with default coordination systems established, for purposes of inter-core communications, between the cores of the processor. Therefore, what is needed is a robust method for enabling reconfigurations of a multi-core microprocessor.

BRIEF SUMMARY OF INVENTION

In one aspect, a method for dynamically reconfiguring one or more cores of a multi-core microprocessor is provided. The method applies to microprocessors that have plurality of cores and at least one set of sideband communication wires, extrinsic to a system bus connected to a chipset, to facilitate non-system-bus inter-core communications, wherein each core is configured to enable it to conditionally drive a sideband communication wire to which it is connected based upon its designation, or lack thereof, as a master core, and wherein at least some of the cores can be reconfigurably designated with or without master credentials for purposes of structuring sideband-based inter-core communications.

As a non-limiting example, the method applies to a microprocessor comprising a plurality of multi-core dies, each having a designated master core, and a set of inter-die sideband communication wires connecting the dies, wherein each core of each die, whether or not designated as the master core, is connected to the set of inter-die sideband communication wires, and is configured to conditionally drive an output on that set based upon its designation, or lack thereof, as the master core of the die, and wherein any core of each die is operable to be reconfigured to designate it, or remove its designation, if any, as the master of its die.

The cores of the processor are provided with an initial configuration that designates at least one core, but not all of the cores, as a master core. The initial configuration may be generated by selectively blowing applicable fuses in each of the cores, wherein the applicable fuses define whether the core has, by default, one or more master credentials. After optionally determining the initial configuration through configuration discovery microcode running on each of the cores, a modified configuration is applied to the cores that removes a master designation from a core initially so designated, and assigns a master designation to a core not initially so designated.

In another aspect, the cores operate in accordance with the modified core configuration, including, for example, coordinating power state management between the cores in a compliant manner.

In yet another aspect, a user, operating through a user interface, defines the modified configuration (within defined constraints, if applicable), and then a system software program provides the modified configuration to the cores, which store it internally.

In a further aspect, the cores are reconfigured according to a provisional configuration that designates a non-master core as a provisional master core, disables the designated master core from driving an applicable sideband communication wire, and enables the provisional master core to drive the applicable sideband communication wire. In a related aspect, a non-master core implements the provisional configuration in response to detecting a condition consistent with disablement, inoperability, a fault, or a failure of the designated master core. The now-provisional master core distributes the provisional configuration to other cores (such as other cores on the same die) affected by the provisional configuration, to enable them to operate in accordance with the provisional configuration. The designated master core may, through a subsequent transaction with the provisional master core, initiate a transfer of control back to itself, at which point the provisional master core repeals the provisional configuration, and affected cores are notified.

BRIEF DESCRIPTION OF THE DRAWINGS

FIG. 3 is a flowchart illustrating operation of the multi-core microprocessor of FIG. 1 to perform a dynamic configuration discovery and modification process according to the present invention.

DETAILED DESCRIPTION OF THE INVENTION

Described herein are embodiments of an apparatus and method for dynamically re-configuring the core configuration of a multi-core microprocessor. In one aspect, multi-core microprocessors and associated methods are provided that support the ability of system software (such as BIOS or an operating system) to disable, or kill, selected cores. Advantageously, the cores are killed in such a way that they do not cause drag on the processor bus shared with the other cores. This may be a desirable feature for performance testing or for software that does not support multiple cores, for examples. In another aspect, multi-core microprocessors and associated methods are provided that support a reconfiguration of an inter-core coordination system of the microprocessor. Advantageously, cores may be selectively designated as masters for purposes of driving signals onto an inter-core communication wire. In this way, a micro-processor may be configured to adapt and even be "self-healing," for purposes of inter-core communications, in response to conditions that disable or render inoperable a designated master core. Moreover, a micro-processor may be configured with a selectable inter-core coordination system optimal to a given task.

In some embodiments, new configurations and designations may be user-specified or provided through system software or firmware, such as BIOS. In other embodiments, adaptive modified designations and/or provisional designations are implemented by internal core logic or microcode in response to detected conditions.

Figure 1:
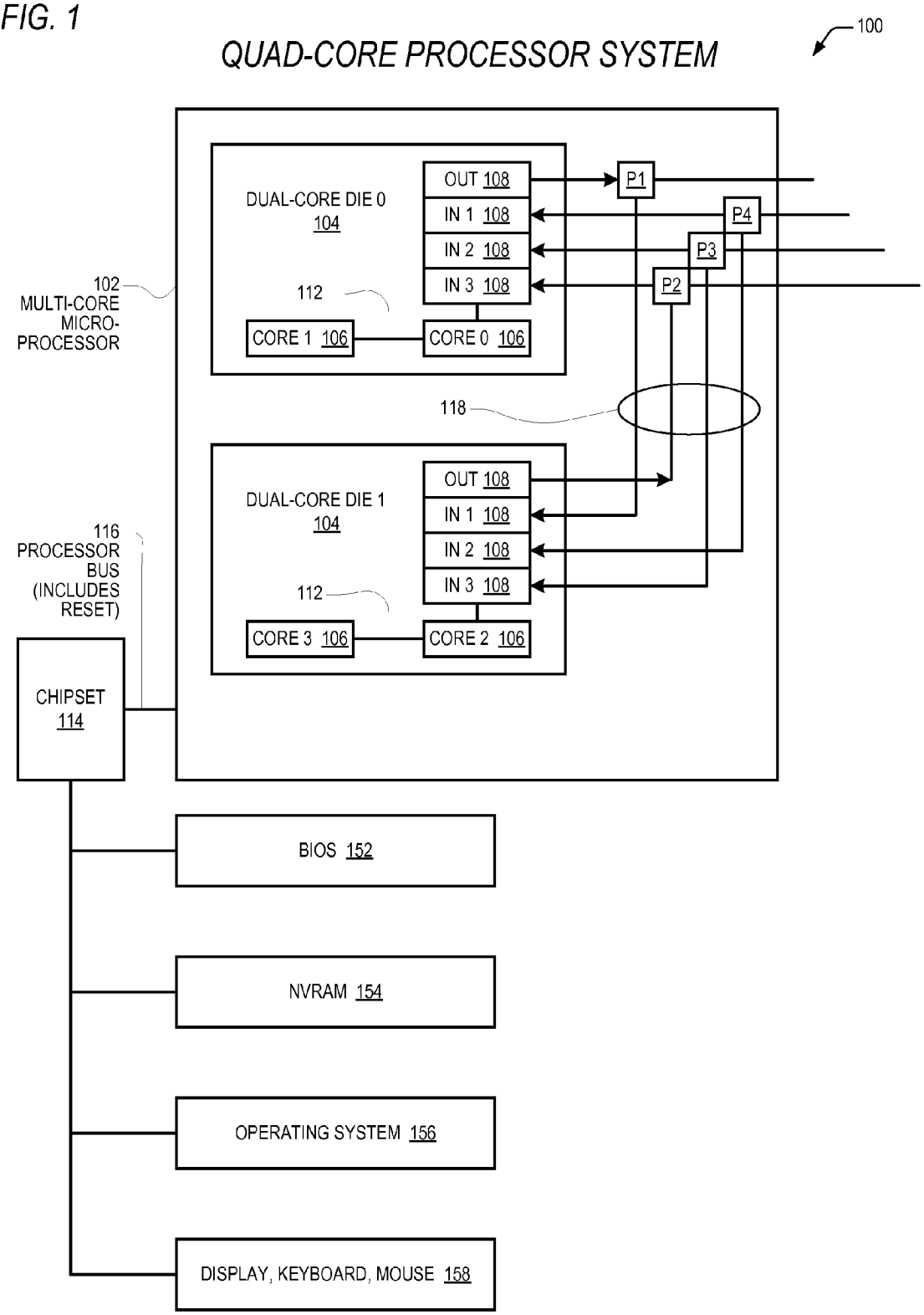
FIG. 1 is a block diagram illustrating a computing system including a multi-core microprocessor according to the present invention.

Referring now to FIG. 1, a block diagram illustrating a computing system 100 including a multi-core microprocessor 102 according to the present invention is shown. The system 100 of FIG. 1 is similar in some respects to FIG. 1 of the section of Ser. No. 61/426,470, filed Dec. 22, 2010, entitled "Decentralized Power Management Distributed Among Multiple Processor Cores," and its concurrently-filed non-provisional, U.S. Pat. No. 8,635,476, issued Jan. 21, 2014 ("the '476 patent"), which are incorporated herein by reference. The system 100 of FIG. 1 is similar in yet further respects to FIG. 1 of the section of Ser. No. 61/426,470, filed Dec. 22, 2010, entitled "Dynamic Multi-Core Microprocessor Configuration," and its concurrently-filed non-provisional, U.S. Pat. No. 8,930,676, issued Jan. 6, 2015 ("the '676 patent"), which are incorporated herein by reference.

The system 100 includes a single chipset 114 coupled to the multi-core microprocessor 102 by a system bus 116 that include a bus clock. The chipset 114 is operable to generate a reset signal that is received on a reset input to the multi-core microprocessor 102. The system 100 also includes a non-volatile memory 152, such as a FLASH memory, for storing system firmware such as BIOS code. The system 100 also includes a non-volatile random access memory 154, such as a battery-backed RAM as is common in personal computing systems or a FLASH memory, for storing a user-specified core configuration, as discussed herein. The system 100 also includes a storage device 156, such as a disk drive, for storing an operating system. Additionally, the system 100 includes input/output devices 158, such as a display for displaying output to a user, such as a core configuration menu displayed by the BIOS 152, and a keyboard and mouse for receiving user input, such as a user-specified core configuration, as described herein.

The multi-core microprocessor 102 package includes two dual-core dies 104, denoted die 0 and die 1. The dies 104 are mounted on a substrate of the package. Each of the dual-core dies 104 includes two processing cores 106. Die 0 includes core 0 and core 1, and die 1 includes core 2 and core 3. The two cores 106 within each die 104 communicate via inter-core communication wires 112 that are internal to the die 104. More specifically, the inter-core communication wires 112 enable the cores 106 within a die 104 to interrupt one another and to send one another messages to coordinate various discovery and management processes between them, including discovery and modification of the microprocessor's configuration.

In one embodiment, the inter-core communication wires 112 comprise a bus having parallel lines. In a related embodiment, the inter-core communication wires 112 comprise a bypass bus similar to that described in the section of Ser. No. 61/426,470, filed Dec. 22, 2010, entitled "Multi-Core Microprocessor Internal Bypass Bus," and its concurrently-filed non-provisional, U.S. Patent App. No. 13/299,014, filed Nov. 17, 2011 ("the '014 application), which are incorporated herein by reference. In other embodiments, the inter-core communication wires 112 comprise a relatively smaller set of inter-core communication wires, comparable in various aspects to alternative sideband configurations described in the '014 application or comparable to the inter-die communications wires described in the '476 patent.

As discussed herein, the term "pal" is used to refer to cores 106 on the same die 104 that communicate with one another over corresponding sideband inter-core communication wires. Thus, in the embodiment of FIG. 1, core 0 and core 1 are pals, and core 2 and core 3 are pals.

Each die 104 provides a plurality of system bus pads for coupling the die to the system bus and a plurality of additional sideband communication pads for coupling the dies to inter-die communication wires 118. Specifically, each die 104 includes four sideband communication pads 108 coupled to four respective pins, denoted "P1", "P2", "P3", and "P4". Of the four sideband communication pads 108, one is an output pad (denoted "OUT") and three are input pads (denoted IN 1, IN 2, and IN 3). In one embodiment, each die 104 is assigned one of the four pads 108 as its output pad (OUT) based on a configuration fuse blown during manufacturing of the multi-core microprocessor 102.

In FIG. 1, the package itself provides a corresponding plurality of sideband communication pins, designated P1 to P4, that are coupled to its inter-die communication wires 118. While such pins are not necessary for carrying out inter-die communications between dies on the package, the pins facilitate external testing of signals carried on the inter-die communication wires 118 and enable larger, multi-package configurations.

The inter-die communication wires 118 are configured as follows. The OUT pad of die 0 and the IN 1 pad of die 1 are coupled to pin P1 via a single wire net; the OUT pad of die 1 and the IN 3 pad of die 0 are coupled to pin P2 via a single wire net; the IN 2 pad of die 0 and the IN 3 pad of die 1 are coupled to pin P3 via a single wire net; and the IN 1 pad of die 0 and the IN 2 pad of die 1 are coupled to pin P4 via a single wire net.

Each die 104 also has a designated master core 106 that controls communications through the die's sideband communication pads. In the embodiment of FIG. 1, core 0 is the master core 106 of die 0, and core 2 is the master core 106 of die 1. In connection with FIG. 1, the term "buddy" refers to master cores 106 on different dies 104 that communicate via sideband inter-die communication wires with one another; thus, in the embodiment of FIG. 1, core 0 and core 2 are buddies.

The inter-die communication wires 118 interconnect the master cores 106 of the dies 104 to further facilitate communication and coordination of various discovery and management processes between them, including, as described herein, discovery and modification of the microprocessor's configuration. More specifically, the inter-die communication wires 118 enable the master cores 106 on distinct dies 104 to interrupt one another and to send one another messages to perform decentralized coordination and discovery activities distributed among the cores 106 of the multi-core microprocessor 102.

For example, when master core 0 of die 0 wants to communicate with master core 2 of die 1, it transmits information on its OUT pad to the IN 1 pad of die 1; similarly, when master core 2 of die 1 wants to communicate with master core 0 of die 0, it transmits information on its OUT pad to the IN 3 pad of die 0. As noted in the '476 patent, not all of the pads and pins shown in FIG. 1 are needed to support a quad-core configuration, and some of them may be removed. But, as also noted in the '476 patent, the additional pads and pins facilitate other processor configurations, such as octa-core embodiments. In some such processor configurations, each OUT pad 108 is coupled to multiple IN pads 108 of other dies 104. To support such configurations, the master core 106 in one embodiment includes an identifier in each message it transmits out of its OUT pad 108 on its inter-die communication wire 118. The identifier uniquely identifies the destination core 106 to which the message is destined, to enable the multiple recipient cores 106 that receive the broadcast message to detect whether it is the intended destination.

Figure 2:
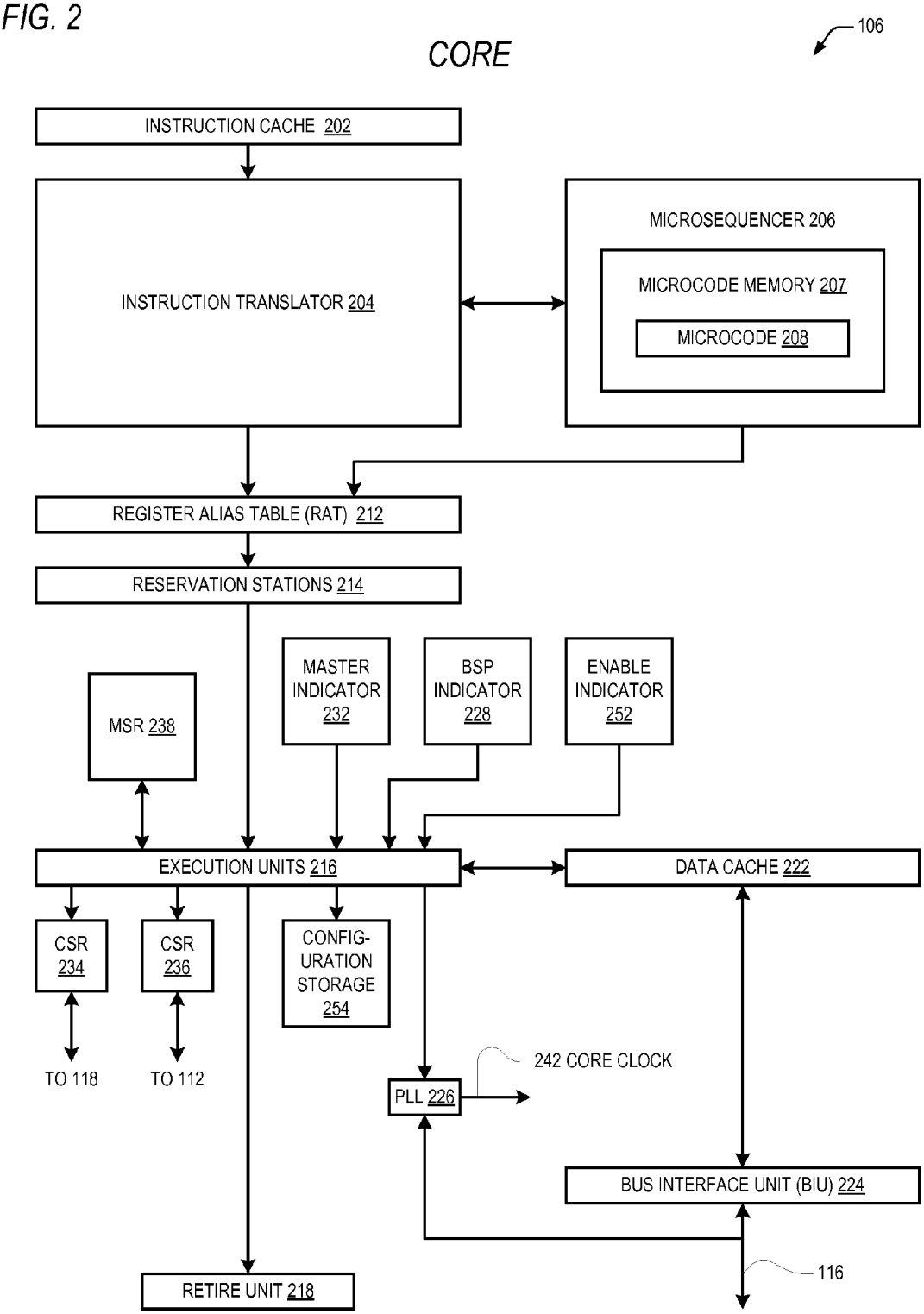
FIG. 2 is a block diagram illustrating in detail a representative one of the cores of FIG. 1 according to the present invention.

Referring now to FIG. 2, a block diagram illustrating in detail a representative one of the cores 106 of FIG. 1 according to the present invention is shown. The core 106 of FIG. 2 is similar in some respects to FIG. 2 of the disclosure of the '476 patent, and in further respects to FIG. 2 of the '676 patent with additional aspects described further below.

According to one embodiment, the core 106 microarchitecture comprises a superscalar, out-of-order execution pipeline of functional units. An instruction cache 202 caches instructions fetched from a system memory (not shown). An instruction translator 204 is coupled to receive instructions, such as x86 instruction set architecture instructions, from the instruction cache 202. A register alias table (RAT) 212 is coupled to receive translated microinstructions from the instruction translator 204 and from a microsequencer 206 and to generate dependency information for the translated microinstructions. Reservation stations 214 are coupled to receive the translated microinstructions and dependency information from the RAT 212. Execution units 216 are coupled to receive the translated microinstructions from the reservation stations 214 and to receive instruction operands for the translated microinstructions. The operands may come from registers of the core 106, such as general purpose registers and readable and writeable model-specific registers (MSR) 238, and from a data cache 222 coupled to the execution units 216. A retire unit 218 is coupled to receive instruction results from the execution units 216 and to retire the results to architectural state of the core 106. The data cache 222 is coupled to a bus interface unit (BIU) 224 that interfaces the core 106 to the bus 116 of FIG. 1. A phase-locked-loop (PLL) 226 receives the bus clock signal from the bus 116 and from it generates a core clock signal 242 to the various functional units of the core 106. The PLL 226 may be controlled, such as disabled, via the execution units 216.

As discussed above in connection with FIG. 1, each die has a designated master core. Moreover, in a related aspect, the processor may have a designated boot service processor (BSP) core which alone is authorized to coordinate certain restricted activities with the chipset 114. Accordingly, different embodiments for credentialing cores with master and/or BSP designations, and for complying with such designations, are contemplated.

In one embodiment, each core 106 includes programmable configuration fuses. The manufacturer of the die 104 may blow various configuration fuses to designate whether the core 106, and/or which of the other cores 106, is a master core or BSP of the die 104, whether the core 106 and/or which of the other cores 106 is enabled, and to designate to each core 106 a uniquely identifying instance, i.e., whether the core 106 is core 0, core 1, core 2, or core 3.

In another embodiment, the master designation of any given core is provided in accordance with its instance. According to one embodiment, the even-numbered core 106 is, by default, the master core of each die 104. According to a related embodiment, core 0 is designated the boot service processor (BSP) of the multi-core microprocessor 102.

In yet another embodiment, an initial master or BSP designation is provided by default (e.g., based on conditions of applicable configuration fuses or based on the core's instance), but may be overridden by a new configuration. And in a further embodiment, master and BSP designations are dynamically reconfigured, or temporarily set aside by corresponding provisional designations, in response to various conditions, such as a designated master or BSP core being in a disabled or suspended condition.

More particularly, as shown in FIG. 2, each core 106 may include a master indicator 232, a BSP indicator 228, and an enable indicator 252. In one embodiment, as discussed above, these indicators constitute fuses that may be selectively blown. For example a fuse associated with enable indicator 252 may be selectively blown to enable or disable the core 106 such that the number of cores 106 available to the system 100 to perform data processing may be less than the number of physical cores 106. In other embodiments, these indicators constitute fuses for providing default values, but these default values are overridden by contrary configurations, if any, stored in model-specific registers (MSRs) 238 or configuration storage 254. In yet another other embodiments, these indicators comprise both fuses for providing default values and native configurable logic operable to override the default values. And in other embodiments, these indicators simply constitute registers that can be toggled on or off.

The execution units 216 receive an enable indicator 252 that indicates whether the core 106 is enabled to perform data processing. The execution units 216 also receive a BSP indicator 228 and a master indicator 232 that indicate whether the core 106 is the master core of the die 104 and the BSP core of the multi-core microprocessor 102, respectively. As discussed above, the BSP indicator 228, the master indicator 232, and the enable indicator 252 may comprise programmable fuses. In an alternative embodiment, the BSP indicator 228, the master indicator 232, and/or the enable indicator 252 are stored in a model specific register (MSR) 238 that is initially populated with the programmable fuse values, but which may be updated by software writes to the MSR 238.

Still further, the core 106 includes configuration storage 254 for storing the core configuration of the multi-core microprocessor 102. In one embodiment, the configuration storage 254 comprises registers; in another embodiment, the configuration storage 254 comprises storage locations within a small random access memory (RAM), such as the PRAM as described in U.S. Pat. No. 7,827,390.

The execution units 216 also read and write control and status registers (CSR) 234 and 236 to communicate with the other cores 106. In particular, the core 106 uses the CSR 236 to communicate with cores 106 on the same die 104 via the inter-core communication wires 112, and the core 106 uses the CSR 234 to communicate with cores 106 on other dies 104 via the inter-die communication wires 118 through the pads 108, as described in the '476 patent.

The microsequencer 206 also includes a microcode memory 207 configured to store microcode. The processing cores 106 are symmetric in that they each have the same instruction set architecture and are configured to execute user programs comprising instructions from the instruction set architecture. For purposes of the present disclosure, the term "microcode" used herein refers to instructions that are executed by the same core 106 that executes architectural instructions of the core 106. That is, any microcode stored in the microcode memory 207 executes, if at all, on its native core 106.

The microcode memory 207 stores microcode that includes internal power state management microcode such as described, in a variety of embodiments, in the '476 patent. The microcode memory 207 also stores microcode that includes configuration discovery and modification microcode 208. More particularly, the configuration discovery and modification microcode 208 is configured, as described below with respect to the method of FIG. 3, to dynamically determine initial (or default) and user-specified (or otherwise reconfigured) core configurations of the multi-core microprocessor 102, to store information specifying the dynamically determined core configurations into the configuration storage 254, and to use the stored information. In one embodiment, user-specified core configuration information is stored into the configuration storage 254 to replace an initial or default core configuration of the multi-core microprocessor 102. In one embodiment, as described below, the configuration discovery and modification microcode 208 is triggered by assertion of a reset pin of the multi-core microprocessor 102. The configuration discovery and modification microcode 208 is preferably duplicated on each core 106 to support scalability. Moreover, the core's internal power state management microcode described in the '476 patent coordinates power state management in accordance with the modified configuration it discovers and stores in response to execution of its configuration discovery and modification microcode 208.

Referring now to FIG. 3, a flowchart illustrating operation of the multi-core microprocessor 102 of FIG. 1 to perform a dynamic configuration discovery and modification process according to the present invention is shown. More specifically, the BIOS 152 of FIG. 1, in conjunction with the microcode 208 of each core 106 of the multi-core microprocessor 102, provides a way to dynamically individually disable or re-enable and reconfigure master configurations for cores 106 post-manufacturing time, i.e., when it is typically too late to blow fuses.

Flow begins at block 302, where a user inputs a desired core configuration of the multi-core microprocessor 102. In one embodiment, the BIOS 152 displays on the display 158 of FIG. 1 a menu to enable the user to specify a desired core configuration. For example, for each physically present core 106 in the multi-core microprocessor 102, the BIOS 152 may display the value of its enable indicator 252, and the user may toggle the value to indicate that a desire to disable or re-enable the core 106 (if the enable indicator 252 indicates the core 106 is enabled, or disabled, respectively).

As discussed in connection with the '476 patent, the microprocessor is preferably also configured for certain coordination and discovery activities, such as power state management, through available sideband communication wires in accordance with a compatible hierarchical coordination system. Generally, a hierarchical coordination system will group the microprocessor's cores into one or more domains, wherein for each domain, one core is designated as a master of that domain, and wherein sideband communication wires are provided between applicable domains. Cores may be restricted on the basis of their master credentials, if any, in their ability to communicate and coordinate with cores of other domains over available sideband communication wires.

CNTR.2527 describes a wide variety of hierarchical coordination systems, with various nested domain structures, various groupings of cores into domains and corresponding kinship groups, and various coordination models within kinship groups. A hierarchical coordination system may be employed for purposes such as power state management, including C-state and P-state implementation and control of shared voltage and clock sources. Generally, a hierarchical coordination system is compatible with the structure and availability of sideband communication wires provided between cores and groups of cores of the microprocessor. Moreover, a hierarchical coordination system applied to the multi-core multiprocessor may be fully or partially specified by a map, a Gödel number, or some combination thereof, and stored along with other configuration information in each core's configuration storage 254, in order to facilitate a decentralized system of inter-core coordinations, discovery processes, and power state management transitions.

For each core, the BIOS 152 may also display the value of its master and BSP indicators 232 and 228, and enable the user to toggle values thereof to redesignate the master credentials of various cores. The BIOS 152 may also display aspects of a default but reconfigurable hierarchical coordination system and enable the user, to an extent compatible with the cores' individual configurability and available sideband communication wires, to add, delete, combine and subdivide domains, redefine corresponding kinship groups, and choose between available coordination models for kinship groups. Thus, the BIOS 152 provides a configuration option to allow the user to disable, re-enable, and reconfigure individual cores 106. The BIOS 152 may also automatically designate an alternate core as a master core, if the user has requested that an originally designated master core be disabled.

Flow proceeds to block 304, where the BIOS 152 saves the user-specified configuration received at block 302 into the NVRAM 154 of FIG. 1.

Flow proceeds to block 306, where the multi-core microprocessor 102 is reset. For example, the BIOS 152 may reset the multi-core microprocessor 102 or the multi-core microprocessor 102 may be reset by some action of the user, such as the user powering on the system 100 or hitting a reset button.

Flow proceeds to block 308, where the reset microcode 208 of each core 106 determines its initial configuration. In one embodiment, the reset microcode 208 of each core 106 determines the initial configuration of the multi-core microprocessor 102 according to the method described in CNTR.2533. As described therein, each core 106 writes the dynamically determined configuration into the configuration storage 254 of FIG. 2.

Flow proceeds to block 312, where the BIOS 152 writes to an MSR 238 of each core 106 that is not included in the user-specified configuration, e.g., to each core 106 that the user desires to be disabled and to each core whose master credentials, if any, the user desires to change. In one embodiment, the BIOS 152 executes an x86 WRMSR instruction to write to the MSR 238. If the user-configuration so specifies, the write to the MSR instructs the core 106 to kill, or disable, itself. Alternatively, if the user-configuration so specifies, the write to the MSR instructs the core 106 to override its default master and/or BSP indicators 232 and 228.

Flow proceeds to block 314, where each core 106 invokes a portion of the microcode 208 that implements the WRMSR instruction in response to the WRMSR executed at block 312. In response to a kill instruction, for example, applicable kill-implementation microcode 208 writes to control registers of the core 106 to kill the core 106. In particular, the kill-implementation microcode 208 writes to the bus interface unit 224 to cause it to not respond to snoop cycles on the bus 116. This advantageously prevents the core 106 from causing drag on the bus by responding to snoop cycles. The drag could be caused by the fact that the snoop response may require the core 106 to inject delay clocks on the bus 116 to give itself additional time to snoop its caches. Finally, the kill-implementation microcode 208 transitions the core to a minimal power consumption state and goes to sleep. For example, the kill-implementation microcode 208 may disable clocks to and/or disconnect power from most of the circuits of the multi-core microprocessor 102. However, the core 106 still remains capable of responding to an external reset on the multi-core microprocessor 102 reset pin. Thus, the microcode 208 never returns to user code. In one embodiment, to revive a killed core 106 requires an external reset via the reset pin of the multi-core microprocessor 102, or equivalently through a corresponding input pad of the core 106, or by de-energizing the core 106.

Flow proceeds to block 316, where the BIOS 152 reads the user-specified configuration from the NVRAM 154 and writes an MSR 238 to any still-enabled cores, i.e., the cores 106 that were not disabled by the user, to indicate the user-specified configuration and to override the initial configuration that was determined at block 308. It is noted that the WRMSR performed at blocks 312 and 316 may be performed by any system software desiring to employ the core 106 killing or reconfiguration feature described herein to re-configure the multi-core microprocessor 102 and is not limited to use by BIOS 152.

Flow proceeds to block 318, where each still-enabled core 106 invokes a portion of the microcode 208 that implements the WRMSR instruction in response to the WRMSR executed at block 316. The microcode 208 receives the user-specified configuration and writes it to the configuration storage 254, thus overwriting the initial configuration written at block 308. The core 106 then operates according to the user-specified configuration.

For example, the core 106 may implement the CPUID instruction by returning the number of enabled cores enumerated in the user-specified configuration stored in the configuration storage 254. In another example, the core 106 uses the information saved at block 314 to coordinate certain power state management functions, such as implementation of requested C-states, P-states, VID levels, and clock frequencies, as described, for example, in connection with the '476 patent and the section of Ser. No. 61/426,470, filed Dec. 22, 2010, entitled "Distributed Management of a Shared Power Source to a Multi-Core Microprocessor," and its concurrently-filed non-provisional, U.S. Pat. No. 8,361,256, issued Jan. 14, 2014 ("the '256 patent"), which are incorporated herein by reference. In another example, the core 106 uses the saved configuration information to perform a multi-core power credit feature described in U.S. Pat. No. 8,914,661, issued Dec. 16, 2014, which is hereby incorporated by reference in its entirety for all purposes.

Flow proceeds to block 322, where the BIOS 152 executes a HLT instruction on each of the remaining cores 106 to halt the core 106, except the core 106 on which the BIOS 152 is running. It is noted that a halted, or sleeping, core 106 is still alive in that it is still snooping the bus 116 and checking its caches, which causes it to possibly generate transactions on the bus 116, which may be detrimental to performance and unnecessarily consume power. However, as described herein, when the BIOS 152 configuration writes to the MSR 238 to kill a core 106 at block 312, the core 106 kills itself at block 314, as opposed to halting itself, so that it is really dead and not snooping the bus 116 or checking its caches or generating transactions on the bus 116, such that the only way the killed core 106 will ever come alive again is a true external reset.

Flow proceeds to block 324, where the BIOS 152 loads the operating system 156 from disk into system memory and transfers control to it. The operating system 156 sends an INIT reset message to all the cores 106 of the multi-core microprocessor 102 to wake them up from their halted state into which they were presumably placed at block 322 by the BIOS 152. In one embodiment, the INIT reset message comprises a well-known I/O-APIC INIT message that instructs the core 106 to perform a subset of the actions it performs in response to a reset, and in particular to come out of its halted state.

Flow proceeds to block 326, where each of the cores 106 that killed itself at block 314 does not respond to the INIT message sent at block 324; rather, the killed cores 106 remain in their killed state until an external reset is performed. However, the remaining enabled cores 106 respond to the INIT message and operate according to the user-specified configuration saved at block 318. In particular, in response to the INIT message, the reset microcode 208 is invoked. However, in response to the INIT message, the reset microcode 208 does not determine its core configuration as at block 308 as it would in response to an external reset. It is noted that the INIT message, which is unique to each core 106, is distinct from assertion of the INIT pin on the bus 116 which resets all cores 106. Flow ends at block 326.

It is noted that the steps performed at block 302 and 304 need only be performed once, i.e., the user need only specify his desired configuration once and the BIOS 152 need only save the user-specified configuration once; whereas, the steps performed at blocks 306 through 326 are performed each time the system is reset and the operating system boots.

As noted above, the dynamic configuration discovery and modification process may support reconfiguration of master designations for cores of the multi-core microprocessor 102. In one embodiment, the hardware on each die 104 is configured such that any core 106 on the die 104 can be configured to drive the OUT pad 108 and hence the inter-die communication wire 118 coupled to the OUT pad 108 to communicate with other cores 106 in the system 100; however, at any given time only one core 106 on the die 104 should be configured to drive the OUT pad 108. This is advantageous in the event that the default master core 106 (i.e., the core 106 configured by the fuses to be the master of the die 104 and/or multi-core microprocessor 102) is inoperative or the BIOS 152 kills it. For example, this would enable one of the remaining cores 106 to become the master and communicate with the buddy cores 106 on other dies 104 to perform power state management, as described for example in the '476 and '256 patents. All cores 106 of the die 104 receive the signals from the IN pads 108 that are connected to the incoming inter-die communication wires 118. Therefore, if the user or a failure disables the default master core 106, then advantageously a remaining core 106 (i.e., the new master) can receive the signals on the incoming inter-die communication wires 118 on behalf of this die 104 and can drive the inter-die communication wire 118 coupled to the OUT pad 108 for this die 104 as described above. In this manner, all possible permutations of core 106 configurations on a given die 104 are supported, according to one embodiment.

To support dynamic core reconfigurations, in one embodiment, relevant fuse values of the core 106 are individually exclusive-OR'ed with a corresponding bit of a register to produce a final value, such as the master indicator 232, BSP indicator 228, and enable indicator 252. Relevant fuse values may also be individually exclusive-OR'ed with a corresponding fuse-do-not-drive indicator 154 and fuse-do-not-drive-freq indicator 354 of FIGS. 2 and 3, respectively, of Ser. No. 13/299,225. The register bits are written by microcode 208, typically in response to a write to an MSR 238. Finally, each core 106 is similarly configured to enable the microcode 208 to write to a bit of a register to dynamically update whether the core 106 drives the inter-die communication wire 118 coupled to the OUT pad 108. Such a configuration may be employed, for example, to designate any core 106 of a dual-core die 104 or a quad-core die configuration as the die's master core.

In a further embodiment, each core 106 that is not a designated master of an applicable domain is configured by internal microcode, in a manner that may be consistent with one of the processes described in Ser. No. 13/299,207, to ascertain whether the designated master of the domain is enabled or in an operating state, and if not, to conditionally reconfigure itself (e.g., on the basis of its instance number relative to other kin cores within that domain) as a provisional master core for the applicable domain, and to assert control over an OUT pad 108 to an applicable sideband communication wire. A designated master core may also be configured, under predefined conditions (e.g., a restricted interruption mode that restricts interrupts based upon their status or urgency), or in response to an applicable instruction, to temporarily delegate a subordinate kin core as the provisional master core. The designated master core may, through a subsequent transaction with the provisional master core, initiate a transfer of control back to itself, at which point the provisional master core repeals the provisional configuration.

Upon assertion or reassertion of control, either as a provisional master core from a designated master, or as a designated master reasserting control from a provisional master, any core assuming the master function is preferably also configured to share the reconfiguration with at least its kin cores, in order to reconfigure the kin cores to coordinate with the newly acting master core instead of previously acting master core.

Interface logic is also preferably provided for implementation of provisional master control that prevents a designated master core, until and if an applicable control transfer transaction is conducted between the designated and provisional master cores, from reasserting control of the OUT pad 108.

In such a manner, a multi-core multiprocessor may be configured to dynamically "heal" itself in response to core faults and core failures. In a maximally self-healing embodiment, each core in any given kinship group is operable to be designated as the master core or provisional master core of its kinship group, including, at the highest kinship group level, as the BSP of the processor. In such an embodiment, inter-core communications can be organized in an efficient hierarchical fashion, but because any master core can be replaced by a subordinate kin core, the microprocessor can reconfigure its hierarchical system around any failed core.

In other embodiments, the cores 106 differ in various aspects from the representative embodiment of FIG. 2 and provide, instead or addition, a highly parallel structure, such as structures applicable to a graphics processing units (GPU).

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A method for dynamically reconfiguring a hierarchical relationship between one or more cores of a multi-core microprocessor comprising a system bus connected to a chipset, a plurality of cores, and sideband communication wires that are distinct from the system bus, the sideband communication wires facilitating non-system-bus inter-core communications, wherein at least some of the cores are operable to be reconfigurably designated as a master core, the method comprising:

determining an initial hierarchical configuration of the cores of the microprocessor, which configuration designates at least one core, but not all of the cores, as a master core; and reconfiguring the cores according to a modified configuration, which modified configuration removes a master designation from the at least one core initially so designated, and assigns a master designation to a core not initially so designated;

wherein each core is configured to conditionally drive an output on a sideband communication wire to which it is connected based upon its designation, or lack thereof, as a master core.

2. The method of claim 1, further comprising generating the initial configuration by selectively blowing applicable fuses in each of the cores, wherein the applicable fuses define whether the core has, by default, one or more master credentials.

3. The method of claim 2, further comprising determining the initial configuration with use of configuration discovery microcode running on each of the cores.

4. The method of claim 1, wherein the modified configuration is provided by a system software program executed by the microprocessor.

5. The method of claim 4, further comprising a user designating the modified configuration through a user interface.

6. The method of claim 1, further comprising storing the modified configuration within the core.

7. The method of claim 6, further comprising coordinating power state management between the cores in accordance with the modified configuration.

8. The method of claim 1, wherein:
the multi-core microprocessor comprises a plurality of multi-core dies;
each multi-core die has a designated master core;
a set of inter-die sideband communication wires is provided between dies of the multi-core microprocessor;
each core of each die is connected to the set of inter-die sideband communication wires, and is conditionally enabled to drive an output on that set based upon its designation, or lack thereof, as the master core of the die; and
any core of each die is operable to be reconfigured to designate it, or remove its designation, if any, as the master of its die.

9. The method of claim 1, further comprising reconfiguring the cores according to a provisional configuration, wherein the provisional configuration:
designates a non-master core as a provisional master core;
disables the designated master core from driving an applicable sideband communication wire; and
enables the provisional master core to drive the applicable sideband communication wire.

10. The method of claim 9, further comprising:
a non-master core implementing a provisional configuration in response to detecting a condition consistent with disablement, inoperability, a fault, or a failure of the designated master core;
the non-master core distributing the provisional configuration to other cores affected by the provisional configuration; and
the non-master core conditionally repealing the provisional configuration if the designated master core, through a subsequent transaction, initiates a transfer of control back to itself.

11. A multi-core microprocessor, comprising:
a plurality of cores;
a system bus connected to a chipset; and
sideband communication wires that are distinct from the system bus that facilitate non-system-bus inter-core communications;
wherein at least some of the cores are operable to be reconfigurably designated with or without master credentials for purposes of configuring which core has primary responsibility for sideband-based inter-core communications;
wherein at least some of the cores are operable to determine an initial hierarchical configuration of cores of the microprocessor, which configuration designates at least one core, but not all of the cores, as the master core;
wherein at least some of the cores are operable to reconfigure the cores according to a modified configuration, which modified configuration removes a master designation from a core initially so designated, and assigns a master designation to a core not initially so designated; and
wherein each core is configured to conditionally drive an output on a sideband communication wire to which it is connected based upon its designation, or lack thereof, as a master core.

12. The multi-core microprocessor of claim 11, wherein the initial configuration is generated by selectively blowing applicable fuses in each of the cores, wherein the applicable fuses define whether the core has, by default, one or more master credentials.

13. The multi-core microprocessor of claim 12, wherein the initial configuration is determined with use of configuration discovery microcode running on each of the cores.

14. The multi-core microprocessor of claim 11, wherein the modified configuration is provided by a system software program executable by the microprocessor.

15. The multi-core microprocessor of claim 14, wherein the modified configuration is designated by a user through a user interface.

16. The multi-core microprocessor of claim 11, wherein the modified configuration is stored within the core.

17. The multi-core microprocessor of claim 16, wherein power state management is coordinated between the cores in accordance with the modified configuration.

18. The multi-core microprocessor of claim 11, wherein:
the multi-core microprocessor comprises a plurality of multi-core dies;
each multi-core die has a designated master core;
a set of inter-die sideband communication wires is provided between dies of the multi-core microprocessor;
each core of each die is connected to the set of inter-die sideband communication wires, and is conditionally enabled to drive an output on that set based upon its designation, or lack thereof, as the master core of the die; and
any core of each die is operable to be reconfigured to designate it, or remove its designation, if any, as the master of its die.

19. The multi-core microprocessor of claim 11, wherein the cores are reconfigured according to a provisional configuration, wherein the provisional configuration:
designates a non-master core as a provisional master core;
disables the designated master core from driving an applicable sideband communication wire; and
enables the provisional master core to drive the applicable sideband communication wire.

20. The multi-core microprocessor of claim 18, wherein:
a non-master core implements a provisional configuration in response to detecting a condition consistent with disablement, inoperability, a fault, or a failure of the designated master core;
the non-master core distributes the provisional configuration to other cores affected by the provisional configuration; and
the non-master core conditionally repeals the provisional configuration if the designated master core, through a subsequent transaction, initiates a transfer of control back to itself.

21. A computer program product encoded in at least one non-transitory computer usable medium for use with a computing device, the computer program product comprising:
computer usable program code embodied in said medium, for specifying a multi-core microprocessor, the computer usable program code comprising:

first program code for specifying a plurality of cores;

second program code for specifying a system bus connected to a chipset; and third program code for specifying sideband communication wires that are distinct from the system bus that facilitate non-system-bus inter-core communications;

wherein at least some of the cores are operable to be reconfigurably designated with or without master credentials for purposes of configuring which core has primary responsibility for sideband-based inter-core communications;

wherein at least some of the cores are operable to determine an initial configuration of cores of the microprocessor, which configuration designates at least one core, but not all of the cores, as a master core;

wherein at least some of the cores are operable to reconfigure the cores according to a modified configuration, which modified configuration removes a master designation from a core initially so designated, and assigns a master designation to a core not initially so designated; and wherein each core is configured to conditionally drive an output on a sideband communication wire to which it is connected based upon its designation, or lack thereof, as a master core.

* * * * *